Patented May 26, 1936

2,042,223

UNITED STATES PATENT OFFICE 2,042,223

REARRANGEMENT OF UNSATURATED HALIDES

Herbert P. A. Groll and James Burgin, Oakland, Calif., assignors to Shell Development Company, San Francisco, Calif., a corporation of Delaware No Drawing. Application June 23, 1934, Serial No. 732,080

22 Claims. (Cl. 260—162)

This invention relates to a novel process for, and certain products of, the conversion of unsaturated organic halides to their corresponding isomers which comprises treating an unsaturated halide in the presence of a strong mineral oxyacid. More particularly, the present invention is concerned with effecting the rearrangement of an unsaturated halide possessing a tertiary carbon atom, particularly an unsaturated tertiary carbon atom to one or a plurality of its possible isomeric unsaturated halides by reacting the unsaturated halide with a sulphuric or phosphoric acid under conditions whereby the intermediately formed halogenated alkyl mineral acid ester is decomposed.

A preferred group of unsaturated halides adaptable to rearrangement in accordance with the principles of our invention includes those unsaturated halides possessing at least one unsaturated tertiary carbon atom and one or a plurality of halogen atoms which may be linked directly to saturated or unsaturated carbon atoms. The unsaturated halide may comprise an alkyl chain which may or may not be linked to a cyclic radical as of the aromatic, alicyclic and heterocyclic series, or may comprise an alicyclic structure. It is to be understood that the unsaturated halide may possess one or a plurality of unsaturated double bonds.

Suitable unsaturated halides which we may employ include compounds such as

We have found that unsaturated halides possessing a halogen atom linked directly to an unsaturated carbon atom are in general less reactive than those unsaturated halides wherein only saturated carbon atoms are linked to halogen atoms and, consequently, the former class of compounds generally require the use of larger amounts of mineral oxyacids and/or higher operating temperatures and/or longer contact times of the reactants.

We prefer to execute our invention with unsaturated halides which contain an unsaturated tertiary carbon, however, we may advantageously employ unsaturated halides which do not contain an unsaturated tertiary carbon. We have found, however, that in the majority of cases when the unsaturated halide does not possess an unsaturated tertiary carbon atom the rate of conversion is relatively slow and unsatisfactory yields of the desired isomeric halides are obtained.

We prefer to execute our invention with strong mineral oxyacids such as $HClO_3$, $HClO_2$, $HClO_4$, $HBrO_3$, $HNO_3$, $HPO_3$, $H_3PO_2$, $H_2SO_4$, $H_2S_2O_7$, $H_3PO_3$, $H_3PO_4$, $H_4P_2O_7$, $H_4P_2O_5$, $H_4P_2O_6$, benzene sulphonic acid, its homologues, analogues and the like. These acids are preferably applied in anhydrous form or as relatively concentrated solutions either in water or some other suitable solvent. The strong polybasic mineral acids such as $H_2SO_4$ and $H_3PO_4$ are particularly adaptable

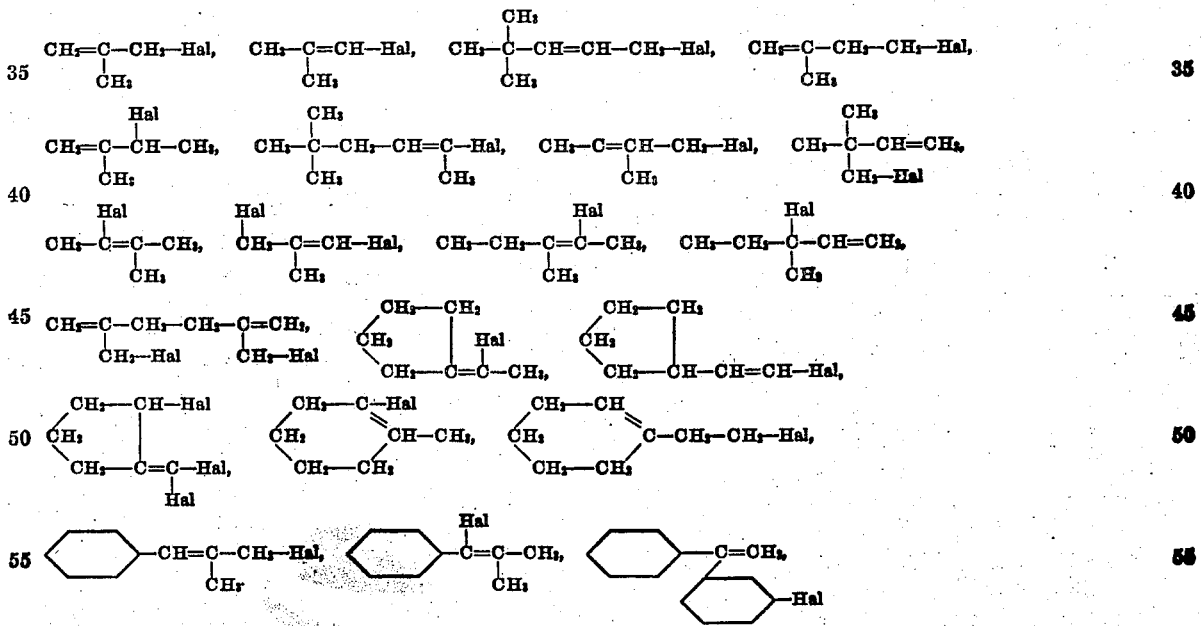

and the like and their homologues, analogues and substitution products.

to our use. In the majority of cases we prefer to employ sulphuric acid due principally to the relative cheapness and availability of this compound as well as to the excellent results attained by its use. The sulphuric acid is preferably applied as an aqueous solution having an $H_2SO_4$ concentration of from about 60% to 100%. The optimum concentration is, in many cases, in the range of from 80% to 90%. When lower acid concentrations are employed, the reaction is usually too slow and requires prolonged contact times of the reactants and/or higher temperatures of operation. The use of $H_2SO_4$ in concentrations greater than about 90% is in many cases accompanied by decomposition of the unsaturated halides, whereby hydrogen halide is liberated and the yield of the desired products is decreased due to the formation of polymerization and condensation products.

In accordance with the present invention it may be assumed that the primary reaction comprises formation of a halogenated mono- and/or polyalkyl ester or mixtures thereof by the reaction of the unsaturated halide with the strong mineral oxyacid applied. This primary reaction may be represented by the specific equation for the reaction of isobutenyl chloride with sulphuric acid.

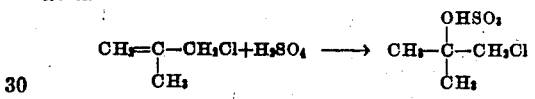

On prolonged contact with an excess of the isobutenyl chloride, the halogenated monoalkyl sulphate may react to form the halogenated dialkyl sulphate.

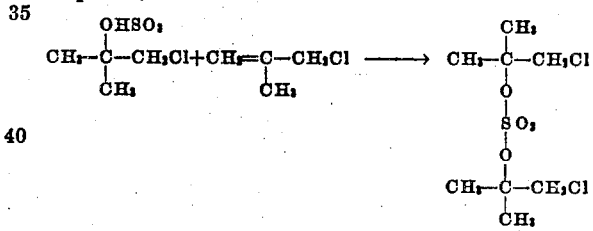

The second step of our process comprises decomposition of the halogenated alkyl mineral oxyacid ester resulting in the formation of sulphuric acid and an unsaturated halide or mixture of isomeric halides. The unsaturated halide or halides obtained may be identical to, or isomeric with the unsaturated halide initially reacted. It will be evident that, on decomposition of the intermediate halogenated alkyl or alkyl acid ester, the double bond may be established between the carbon atom linked directly to the mineral acid group and any of the vicinal carbon atoms. The relative amounts of the isomers obtained will depend on the steric relations of the constituents of the molecule of the halide reacted, which relations generally result in equilibrium proportions of the various isomers. For example, isobutenyl chloride may be substantially completely reacted with sulphuric acid to form the corresponding mono- or dialkyl sulphate which is decomposed in accordance with the following equation to yield an equilibrium mixture of isobutenyl chloride and isocrotyl chloride.

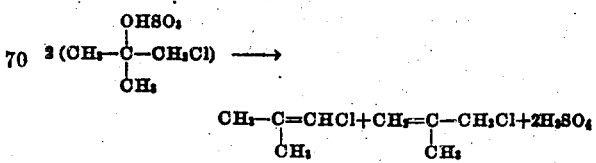

This particular equilibrium mixture was found to consist of 90% isocrotyl chloride and 10% isobutenyl chloride.

In support of our theory as to the mechanism of the reactions which we assume to occur in the execution of our invention, we have found that identical halogenated mono- or polyalkyl mineral acid esters are obtained when two isomeric unsaturated halides produced by our method are reacted with the same mineral oxyacid.

Our invention may be executed employing varying relative amounts of the unsaturated halide and mineral oxyacid. We may react stoichiometrical proportions of the unsaturated halide and acid, and effect the thermic decomposition of the resulting halogenated alkyl ester, or we may effect the direct conversion of the unsaturated halide to its isomer or isomers by contact of the unsaturated halide with relatively small amounts of acid under conditions at which the intermediately formed halogenated alkyl acid ester or esters is or are unstable.

It was found that an unsaturated halide such as isobutenyl chloride can be rearranged and its resulting equilibrium mixture with its isomeric isocrotyl chloride obtained by contacting the isobutenyl chloride with sulphuric acid in the ratio of about 10 mols of unsaturated halide to about 1 mol of sulphuric acid. The rearrangement was effected without the relatively small amount of acid entering into permanent solution with the excess of unsaturated halide. This observation indicated that the mineral acid might function solely as a rearrangement catalyst. However, it was found that the addition of the mineral acid is accompanied by a marked rise in temperature of the reaction mixture which is probably due to the addition of the acid to the double bond to form the intermediate halogenated alkyl ester. This reaction, which precedes the rearrangement, is known to be, in the cases tested, exothermic. It is assumed that the intermediate mineral acid ester is first formed but under the present conditions of operation is breaks down substantially as soon as it is formed with liberation of sulphuric acid which in turn reacts with more of the initially applied unsaturated halide. In this way, the progression of the reaction in the presence of relatively small amounts of the polybasic mineral acid may be explained.

In a preferred mode of execution of our invention, an excess of an unsaturated halide is contacted with a strong mineral oxyacid. The reaction is conducted in a suitable acid resistant reaction vessel provided with means for accurately controlling the temperature of its contents. It is desirable that means for efficient agitation of the reaction mixture be provided. The mineral oxyacid or aqueous solution thereof, with or without inert diluents is added preferably, relatively slowly to the agitated and cooled unsaturated halide.

Our process may be executed at varying temperatures depending on the particular halide treated, on the amount, concentration and strength of the particular mineral oxyacid employed and on the desired contact time of the reactants. In general, with the stronger acids such as sulphuric, excellent results may be obtained by executing the process at temperatures of about 5° C. to 25° C. When the rearrangement is effected with relatively small amounts of mineral acid, the acid may be added at temperatures near the upper limit of this temperature range. If stoichiometrical amounts of unsaturated halide and acid are reacted, we prefer to effect the primary reaction within a lower temperature range.

We have found that in those cases where the invention is executed employing a relatively large excess of the unsaturated halide, excellent results may be obtained by contacting the reactants at about room temperature and permitting the rearrangement to occur at temperatures up to about 45° C. The use of higher temperatures may in some cases be resorted to but, in general, their use results in the occurrence of undesirable polymerization and condensation reactions. The reaction mixture of unsaturated halide and oxyacid is usually stirred until the reaction is substantially complete. The time of contact of reactants may be varied depending mainly on the temperature of operation and on the amount and strength of the mineral acid employed.

When stoichiometrical amounts of the unsaturated halide and oxyacid are reacted, the resulting halogenated alkyl ester may be substantially completely decomposed to isomeric unsaturated halides and the initially applied acid without resorting to its separation from the reaction mixture. The acidic reaction mixture is preferably slowly introduced into the kettle or column of a distilling apparatus or into a suitable flash evaporating apparatus heated to from about 70° C. to about 120° C., or to a temperature at which the ester is readily decomposed, whereby removal of the unsaturated halides may be effected at substantially the same rate at which the reaction mixture is admitted. In this manner, the prolonged contact of the unsaturated halides with the acid at elevated temperatures is avoided.

The mixtures of the isomeric unsaturated halides obtained by our method may be used as such or the constituents may be separated by any suitable means. In general, due to the similarity in molecular structure and physical properties, the isomeric unsaturated halides are not readily or efficiently separated by distilling and/or fractionating means. However, they may, in many cases, be separated by utilizing their differences in reactivity with respect to certain reactants. For example, equilibrium mixtures of isocrotyl chloride which contain 10% isobutenyl chloride may be purified by resorting to the following expedient. The equilibrium mixture is treated at an elevated temperature with an aqueous solution of a strongly basic substance whereby the isobutenyl chloride is hydrolyzed to isobutenol while isocrotyl chloride is substantially unchanged. The resulting reacted mixture may be fractionated and the isocrotyl chloride recovered as a constant boiling mixture with water. In many instances, the isomeric unsaturated halides may be separated by selective extraction methods.

It will be evident to those skilled in the art to which our invention pertains that our process may be executed in a batch, intermittent or continuous manner. The unsaturated halide to be treated may be intermittently or continuously fed into a suitable reaction stage or stages wherein it is contacted with a suitable acid and its rearrangement effected. The resulting mixture of unsaturated halides may be continuously withdrawn from the reaction vessel and conducted to a separation or purification stage or stages wherein separation and/or purification is effected.

In the execution of our invention, we have found that those unsaturated halides which possess a quartenary, tertiary or aromatic carbon atom in a position once removed from an unsaturated tertiary carbon atom do not behave normally when treated in accordance with our method. The results attained are in most cases unsatisfactory due to relatively low yields and the occurrence of undesirable side reactions occasioned by the necessity of operating under vigorous conditions in order to accelerate the rate of reaction which in general proceeds much more slowly than is the case with those unsaturated halides which do not possess such a structural arrangement.

The following examples are introduced for the purpose of illustrating the mode of execution of our invention. It is to be understood that we do not intend to limit our invention to the specific operating conditions herein set forth.

Example I 181 gm. (2.0 mols) of isobutenyl chloride were placed in a reaction vessel equipped with a stirrer and cooled to about 10° C. While the cooled isobutenyl chloride was vigorously stirred, 143 gm. of an 80.54% $H_2SO_4$ solution (1.75 mols of $H_2SO_4$) was added over a period of 10 minutes. After all the acid had been added the mixture was stirred for one hour at a temperature of about 10° C.

At the end of this time the reaction mixture was discharged from the reaction vessel and allowed to stratify. The two liquid layers were separated. The upper layer (61.0 gm.) was found to consist of 91% isocrotyl chloride and 9% isobutenyl chloride.

The lower layer (259.0 gm.) which consisted principally of the halogenated alkyl sulphate was slowly introduced into a distilling flask immersed in a glycerine bath heated to a temperature of about 110° C. A mixture of unsaturated halides distilled from the flask at substantially the same rate at which the acidic mixture was added.

The distillate (104.5 gm.) was analyzed and found to consist of 85.5% isocrotyl chloride and 14.5% isobutenyl chloride.

Example II 25.6 gm. of an 80% sulphuric acid solution (0.2 mol $H_2SO_4$) were slowly added to 131.0 gm. (2.0 mols) of isobutenyl chloride while the temperature of the mixture was kept at or below about 24° C. When all of the sulphuric acid had been added, the temperature of the reaction mixture was allowed to rise to about 40° C. The stirring was continued for 2.5 hours at this temperature.

At the end of this time the reaction mixture was removed from the reaction vessel and allowed to stratify. The upper layer was separated, washed with a small amount of a concentrated $K_2CO_3$ solution and fractionated. An equilibrium mixture of isocrotyl chloride (90%) and isobutenyl chloride (10%) was obtained. The lower or halogenated alkyl ester layer was discarded, since the loss of unsaturated halide thereby incurred was only about 5%.

About 75% of the applied isobutenyl chloride was converted to isocrotyl chloride.

Example III

About 5 gallons of crude isobutenyl chloride containing about 5% isocrotyl chloride were charged to a lead-lined agitator and about 3 pounds of an 85% $H_2SO_4$ solution were added while the reaction mixture was stirred and kept at about room temperature. When all of the sulphuric acid had been added, the temperature was allowed to rise to about 40° C. at which temperature it was agitated for about 5 hours.

At the end of this time the reaction mixture was removed from the reaction vessel and allowed to stratify. The upper layer was separated and the dissolved or entrained sulphuric acid was neutralized.

The neutralized mixture, which contained in addition to isocrotyl chloride about 9% isobutenyl chloride and small amounts of dichlor-isobutane and polymerization products was agitated in an autoclave for about 1 hour with 15 mol percent of a 20% sodium hydroxide solution at about 150° C.

The product was then fractionated from the autoclave. 4.3 gallons of pure isocrotyl chloride were collected.

The pure isocrotyl chloride boiled at 68.0° C. and had a specific gravity (20/4) of 0.9186.

Example IV 90.5 gm. (1.0 mol) of isobutenyl chloride were stirred in a flask while about 0.5 mol of $H_3PO_4$ as an 85% aqueous solution was added.

The reaction mixture was agitated at a temperature of about 72° C. for about 2 hours.

About 50% of the applied isobutenyl chloride was converted to isocrotyl chloride.

Example V 3.5 kilos of a 96% $H_2SO_4$ solution were slowly added to 12 kilos of isoamylene chlorhydrine $$(CH_3-COH-CH_2Cl-CH_3)$$
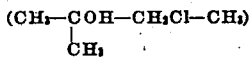

which was prepared by reaction trimethyl ethylene with chlorine water. During the contacting of the reactants, the reaction mixture was violently agitated and its temperature kept below about 30° C. When all of the acid had been added, the reaction mixture was fed into a flash evaporator kept at a temperature of from about 90° C. to about 100° C. The vapours given off were condensed.

The condensate consisted of a mixture of 92% of 1,2,2-trimethyl vinyl chloride $$(CH_3-C=CCl-CH_3)$$
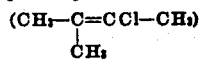

and 8% of dimethyl allyl chloride. This mixture of isomeric halides was treated with an NaOH solution and the dimethyl allyl chloride was hydrolyzed. The hydrolyzed mixture was fractionated.

8.9 kilos of trimethyl vinyl chloride and 0.6 kilos of dimethyl allyl alcohol were obtained.

Example VI 1.4 lbs. of dichloro tertiary butyl alcohol $$(CH_2Cl-COH-CH_2Cl)$$
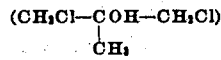

were slowly introduced below the liquid level of about 0.7 lb. of 96% $H_2SO_4$ contained in a flask heated to about 100° C. The pressure in the flask was reduced to about 80 mm. of mercury and the product allowed to distill from it. The condensed distillate was found to contain about 20% of a dichloro isobutylene of the formula $$CHCl=C-CH_2Cl$$
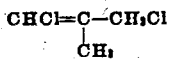

and about 80% of the dichloro isoamylene of the formula $$CH_2Cl-C=CH_2$$
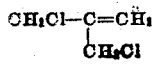

Example VII 209 gm. (2.0 mols) of a mixture of unsaturated and saturated mono-chlorides, prepared by the chlorination of tertiary amylene, were cooled and mixed with 19.6 gm. (6.16 mol) of an 80% $H_2SO_4$ solution. This mixture was stirred for about 2.5 hours at a temperature of from about 38° C. to 42° C. At the end of this time the mixture was allowed to stratify. The upper layer was separated, washed with water, neutralized with $Na_2CO_3$, dried and fractionated. The cut distilled from 90° C. to 110° C. was analyzed. The composition of this cut as compared with that of the initially treated material was as follows:

|  | Before $H_2SO_4$ treatment | After $H_2SO_4$ treatment |
|---|---|---|
| Unsaturated unhydrolyzable chloride | Percent 1.8 | Percent 28.9 |
| Unsaturated hydrolyzable chloride | 79.1 | 39.3 |
| Tertiary amyl chloride | 19.1 | 31.8 |

The principles of our invention may be advantageously applied to a process for the conversion of certain relatively unreactive unsaturated halides to an isomer or isomers which are more reactive and hence can be used as intermediates in the preparation of alcohols, ethers, esters and the like. In general, the unsaturated halides of the vinyl type (possessing a halogen atom linked directly to an unsaturated carbon atom) are less reactive than their isomers wherein a halogen atom or atoms is or are linked to saturated carbon atoms. For example, isobutenyl chloride $$(CH_2=C-CH_2Cl)$$
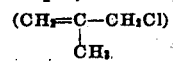

is readily hydrolized to isobutenol $$(CH_2=C-CH_2OH)$$
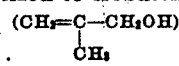

while the halide isomeric with it, namely isocrotyl chloride $$(CH_3-C=CHCl)$$
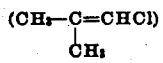

is hydrolyzed with great difficulty even under the most severe conditions. Isocrotyl chloride is obtained directly as a by-product in the process of preparing isobutenyl chloride by chlorinating isobutylene. It is also available by splitting HCl from dichloro-isobutane, another by-product obtained when isobutylene is chlorinated. Now our invention provides a means of considerably increasing the yield of useful products in this and the like related processes. Isocrotyl chloride may be treated with a small amount of sulphuric acid whereby about 10% of it is converted to isobutenyl chloride. The reaction mixture may be stratified and the $H_2SO_4$ layer separated. The unsaturated halide layer may be treated under conditions whereby the isobutenyl chloride is hydrolyzed and the hydrolysis product removed; the unchanged isocrotyl chloride being returned to a reaction vessel. This step process may be repeated until substantially all of the isocrotyl chloride is converted to isobutenyl chloride and ultimately to isobutenol.

It will be of interest to note that the principles of our invention may be generally applied to the treatment of halogenated alkyl esters of strong mineral oxyacids. For example, a haloalkyl neutral or acid sulphate prepared by any method may be treated as herein described and substantial yields of an unsaturated halide or mixture of isomeric unsaturated halides obtained. However, the yields of unsaturated halide are in general higher in those preferred cases where the resulting halide or halides can be reacted with a strong mineral oxyacid to form the haloalkyl ester.

It is to be understood that the term "mineral oxyacid", as used in this specification and the appended claims, is intended to include inorganic mineral oxygen-containing acids as well as those organic compounds which contain oxygen and a mineral acid constituent and are capable of acting as inorganic oxygen-containing acids. For example, a group of suitable mineral oxyacids includes, in addition to the inorganic oxygen-containing acids, compounds such as benzene sulphonic acid, its homologues, analogues and the like.

While we have in the foregoing described in some detail the preferred embodiments of our invention and some variants thereof, it will be understood that this is only for the purpose of making the invention more clear and that the invention is not to be regarded as limited to the details of operation herein described, nor is it dependent upon the soundness or accuracy of theories which we have advanced as to the advantageous results attained. On the other hand, the invention is to be regarded as limited only by the terms of the accompanying claims, in which it is our intention to claim all novelty inherent therein as broadly as possible in view of the prior art.

We claim as our invention.

1. A process for the conversion of unsaturated organic halides to isomeric halides which comprises reacting an unsaturated halide containing an olefinic linkage between two aliphatic carbon atoms at least one of which is devoid of halogen atoms, said compound being devoid of conjugated double bonds and allene structures with a strong mineral oxyacid and effecting the decomposition of the resulting intermediate compound.

2. A process for the conversion of unsaturated organic halides to isomeric halides which comprises reacting an unsaturated halide containing an olefinic linkage between two aliphatic carbon atoms at least one of which is devoid of halogen atoms, said compound being devoid of conjugated double bonds and allene structures with a strong mineral oxyacid at a temperature at which substantial conversion of the unsaturated halide to an isomeric halide occurs.

3. A process for the conversion of unsaturated organic halides to isomeric halides which comprises reacting an organic halide containing an unsaturated tertiary carbon atom embraced in an olefinic linkage of aliphatic character, said compound being devoid of conjugated double bonds and allene structures with a strong mineral oxyacid and effecting the decomposition of the resulting intermediate compound.

4. A process for the conversion of unsaturated organic halides to isomeric halides which comprises reacting an organic halide containing an unsaturated tertiary carbon atom embraced in an olefinic linkage of aliphatic character, said compound being devoid of conjugated double bonds and allene structures with a strong mineral oxyacid at a temperature at which substantial conversion of the unsaturated halide to an isomeric halide occurs.

5. A process for the conversion of unsaturated organic halides to isomeric halides which comprises reacting an organic halide containing an unsaturated tertiary carbon atom embraced in an olefinic linkage of aliphatic character, said compound being devoid of conjugated double bonds and allene structures with a not greater than equimolecular amount of a strong mineral oxyacid and heating the resulting intermediate compound.

6. A process for the conversion of unsaturated organic halides to isomeric halides which comprises reacting an organic halide containing an unsaturated tertiary carbon atom embraced in an olefinic linkage of aliphatic character, said compound being devoid of conjugated double bonds and allene structures with a relatively small amount of a strong mineral oxyacid at a temperature at which the intermediately formed compound is unstable.

7. A process for the conversion of unsaturated organic halides to isomeric halides which comprises reacting an unsaturated halide containing an olefinic linkage between two aliphatic carbon atoms at least one of which is devoid of halogen atoms, said compound being devoid of conjugated double bonds and allene structures with sulphuric acid, and effecting the decomposition of the resulting intermediate compound.

8. A process for the conversion of unsaturated organic halides to isomeric halides which comprises reacting an unsaturated halide containing an olefinic linkage between two aliphatic carbon atoms at least one of which is devoid of halogen atoms, said compound being devoid of conjugated double bonds and allene structures with sulphuric acid at a temperature at which substantial conversion of the unsaturated halide to an isomeric halide occurs.

9. A process for the conversion of unsaturated organic halides to isomeric halides which comprises reacting an organic halide containing an unsaturated tertiary carbon atom embraced in an olefinic linkage of aliphatic character, said compound being devoid of conjugated double bonds and allene structures with sulphuric acid and effecting the decomposition of the resulting intermediate compound.

10. A process for the conversion of unsaturated organic halides to isomeric halides which comprises reacting an organic halide containing an unsaturated tertiary carbon atom embraced in an olefinic linkage of aliphatic character, said compound being devoid of conjugated double bonds and allene structures with sulphuric acid at a temperature at which substantial conversion of the unsaturated halide to an isomeric halide occurs.

11. A process for the conversion of unsaturated organic halides to isomeric halides which comprises reacting a mono-olefinic organic halide containing an unsaturated tertiary carbon atom embraced in an olefinic linkage of aliphatic character, said tertiary carbon atom being more than once removed from a quaternary carbon atom, with sulphuric acid at a temperature at which substantial conversion of the unsaturated halide to an isomeric halide occurs.

12. A process for the conversion of unsaturated organic halides to isomeric halides which comprises reacting a mono-olefinic organic halide containing an unsaturated tertiary carbon atom embraced in an olefinic linkage of aliphatic character, said tertiary carbon atom being more than once removed from a carbon atom embraced in an aromatic structure, with sulphuric acid at a temperature at which substantial conversion of the unsaturated halide to an isomeric halide occurs.

13. The step which comprises decomposing the halogenated hydrocarbon ester of a mineral oxyacid wherein the mineral oxyacid radical is linked to at least one aliphatic group containing a plurality of carbon atoms at a temperature at which substantial amounts of unsaturated organic halide are obtained.

14. A process for the conversion of isobutenyl chloride to isocrotyl chloride which comprises reacting isobutenyl chloride with sulphuric acid and effecting the decomposition of the resulting intermediate compound.

15. A process for the conversion of isobutenyl chloride to isocrotyl chloride which comprises reacting isobutenyl chloride with sulphuric acid at a temperature at which substantial conversion of the isobutenyl chloride to isocrotyl chloride occurs.

16. A process for the conversion of unsaturated organic halides to isomeric halides which comprises treating an unsaturated halide containing an olefinic linkage between two aliphatic carbon atoms at least one of which is devoid of halogen atoms, said compound being devoid of conjugated double bonds and allene structures in the presence of a small amount of a strong mineral oxyacid under conditions at which substantial conversion can occur.

17. The equilibrium mixture of isobutenyl chloride and isocrotyl chloride obtained by reacting isobutenyl chloride with sulphuric acid and effecting the decomposition of the resulting intermediate compound.

18. A process for the conversion of an unsaturated organic halide to an isomeric unsaturated halide which comprises reacting a mono-olefinic unsaturated halide containing an olefinic linkage between two aliphatic carbon atoms at least one of which is devoid of halogen atoms with a strong mineral oxy-acid and effecting the decomposition of the resulting intermediate compound.

19. A process for the conversion of an unsaturated organic halide to an isomeric unsaturated halide which comprises reacting a mono-olefinic unsaturated halide containing an olefinic linkage between two aliphatic carbon atoms at least one of which is tertiary with a strong mineral oxy-acid at a temperature at which substantial conversion of the treated halide to its isomer occurs.

20. A process for the conversion of an unsaturated organic halide to an isomeric unsaturated halide which comprises reacting a mono-olefinic, monohalogenated organic compound containing an olefinic linkage between two aliphatic carbon atoms and the halogen atom linked to a saturated carbon atom with a relatively small amount of a strong mineral oxy-acid at a temperature at which the intermediately formed compound is unstable.

21. A process for the conversion of an unsaturated organic halide to an isomeric unsaturated halide which comprises reacting a compound of the general formula

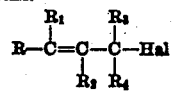

wherein R, R₁, and R₂ may be the same or different and represent hydrogen atoms or organic radicals linked to the unsaturated carbon atoms by saturated carbon atoms, and R₃ and R₄ may be the same or different and represent hydrogen atoms, halogen atoms or organic radicals, with a polybasic mineral acid and effecting the decomposition of the resulting intermediate compound.

22. A process for the conversion of an unsaturated organic halide to an isomeric unsaturated halide which comprises reacting a mono-olefinic halide of the general formula

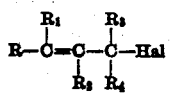

wherein R₁ and R₂ may be the same or different and represent hydrogen atoms or organic radicals with a free carbon linkage, R₃ and R₄ may be the same or different and represent hydrogen atoms, halogen atoms or organic radicals with a free carbon linkage and R₂ represents an organic radical with a free carbon linkage, with sulphuric acid at a temperature at which substantial conversion to the corresponding isomeric unsaturated halide occurs.

HERBERT P. A. GROLL.
JAMES BURGIN.